United States Patent [19]

Chominski

[11] Patent Number: 4,916,295
[45] Date of Patent: Apr. 10, 1990

[54] DOCUMENT DETECTING ARRANGEMENT

[75] Inventor: Pawel Chominski, Huddinge, Sweden

[73] Assignee: Inter Innovation AB, Stockholm, Sweden

[21] Appl. No.: 198,354

[22] Filed: May 25, 1988

[30] Foreign Application Priority Data

Jun. 12, 1987 [SE] Sweden .................. 87-02455

[51] Int. Cl.$^4$ ............................................. G06K 7/08
[52] U.S. Cl. ........................................ 235/449; 360/110
[58] Field of Search ............... 235/450, 449; 369/149, 369/146; 364/535; 360/125, 115, 111, 110, 66; 209/567, 568, 569, 570, 534; 382/64; 324/260, 239, 228, 261, 262

[56] References Cited

U.S. PATENT DOCUMENTS

| | | | |
|---|---|---|---|
| 2,884,348 | 4/1959 | Kulesza | 360/66 |
| 3,097,745 | 7/1963 | Leo | 209/569 |
| 3,168,720 | 2/1965 | Eckert, Jr. | 382/64 |
| 3,212,058 | 10/1965 | Sanner | 382/64 |
| 3,611,329 | 10/1971 | Lee | 360/125 |
| 4,045,738 | 8/1977 | Buzzell | 324/239 |
| 4,218,612 | 8/1980 | Krehl et al. | 235/449 |
| 4,399,553 | 8/1983 | Toyama | 382/64 |
| 4,518,919 | 5/1985 | Ishida | 324/228 |
| 4,584,529 | 4/1986 | Aoyama | 324/261 |
| 4,748,525 | 5/1988 | Perlov | 360/110 |

FOREIGN PATENT DOCUMENTS 0732986  5/1980  U.S.S.R. .................. 360/125

Primary Examiner—Parshotam S. Lall
Assistant Examiner—S. A. Melnick
Attorney, Agent, or Firm—Sughrue, Mion, Zinn, Macpeak & Seas

[57] ABSTRACT

An arrangement for detecting bank notes having magnetic properties, comprising transport means (11) for transporting documents past a magnetic detector (12-14). The object of the invention is to increase the possibility and the reliability of distinguishing bank notes which are not genuine from genuine bank notes and bank notes of a given denomination/kind from bank notes of another denomination/kind.

The detector includes a permanent magnet (12) and a magnetic circuit (13) having detector means (14) for detecting changes in the magnetic field through the magnetic circuit (13). The output side of the detecting means (14) is connected to a signal processing means (20) for generating signals in response to the magnetic properties of bank notes transported through the arrangement.

The magnetic circuit (13) includes an air gap (131) which is located closely adjacent the bank note transport path (0—0). The magnetic flux of the permanent magnet (12) in the air gap (131) is directed in a plane at right angles to the direction of the transport path (0—0) closely adjacent the air gap.

2 Claims, 2 Drawing Sheets

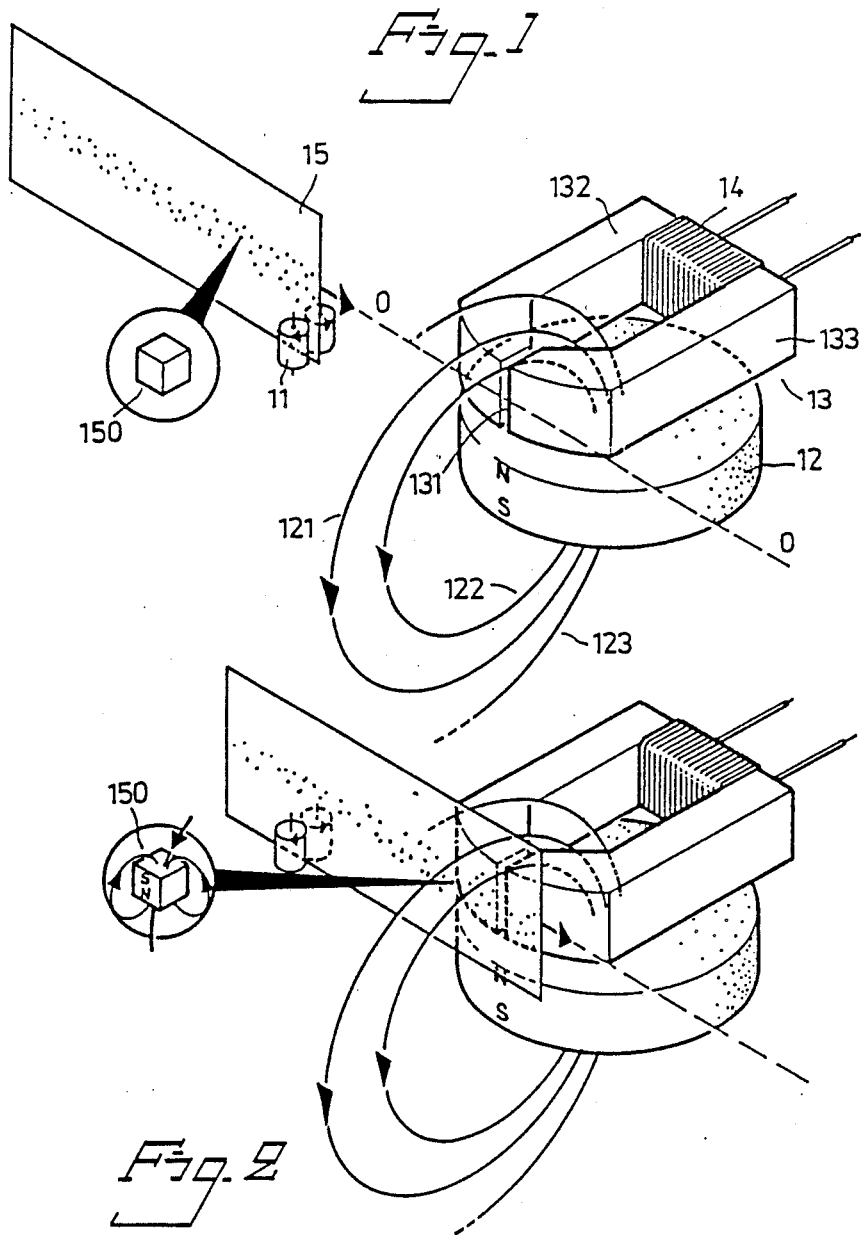

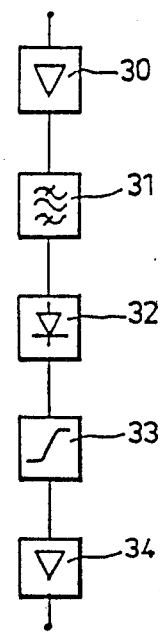
Fig. 3
A
Fig. 4
B
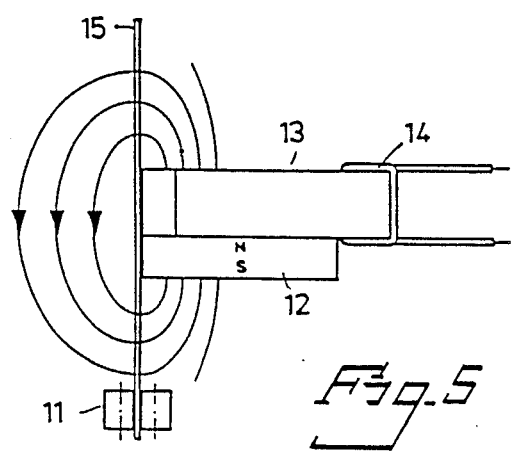
Fig. 5

DOCUMENT DETECTING ARRANGEMENT

TECHNICAL FIELD

The present invention relates to an arrangement for detecting documents, such as bank notes, cheques, coupons and like documents, which exhibit magnetic properties. The arrangement includes document transporting means operative in feeding documents along a document feed path, past a magnetic detector.

BACKGROUND PRIOR ART

Apparatus intended, inter alia, for checking and controlling means of payment, e.g. currency, substitute currency and other credit instruments or documents are known to the art. An example of such apparatus is found, for instance, in Swedish Lay-Out Print No. 448037, in which the means of payment contains magnetic particles and is passed through a primary magnetic field. The presence of secondary or introduced magnetic fields induced by the presence of the primary magnetic field are detected separately, and an error signal is produced when the means of payment located in the primary magnetic field fails to introduce secondary magnetic fields.

The drawback with this known apparatus is that the effect of the detection of the secondary, introduced magnetic fields is liable to be impaired as a result of poor signal/noise relationships and because it is the absolute level of the introduced, secondary magnetic field which is to be detected.

The object of the present invention is, inter alia, to greatly reduce this risk and to integrate the primary magnetic field source and the detector in one and the same function.

SUMMARY OF THE INVENTION

An inventive arrangement comprises a primary magnetic-circuit generating device which is positioned in such close relationship with a document feed path as to cause a change in the magnetic circuit when a document having magnetic properties passes along said path and into the magnetic field. It has been found in practice that such an arrangement is particularly insensitive to external disturbance, but sensitive to the presence of passing documents that have magnetic properties, such as to obtain via detector means connected to the magnetic field generating circuit signals which are highly dependent on the different magnetic properties of mutually different documents. The mutually different "profiles" of these signals enable documents which are not genuine to be distinguished positively and quickly from genuine documents (counterfeit bank notes copied from genuine bank notes) and also one kind of genuine documents from another kind of genuine document (Swedish one hundred kronor notes from Swedish one thousand kronor notes, etc.).

BRIEF DESCRIPTION OF THE DRAWINGS

The invention will now be described in more detail with reference to the accompanying schematic drawings, in which FIG. 1 illustrates a magnetic detector positioned along a bank note transport path;

FIG. 2 illustrates the arrangement shown in FIG. 1 with a bank note which is beginning its passage past the detector;

FIG. 3 is a block schematic of a signal processing means connected to the detector;

FIG. 4 illustrates diagrammatically signals obtained from two mutually different bank notes passing the detector; and FIG. 5 illustrates the arrangement of FIG. 2 seen straight from one side and in the transport direction.

DESCRIPTION OF PREFERRED EMBODIMENTS

The arrangement illustrated in FIG. 1 includes a magnetic detector 12–14 comprising a device 12 for generating a permanent, primary magnetic field in a symmetric magnetic circuit 13 of a detector device 14 having the form of a coil which is intended to detect any change which might occur in the magnetic field.

The device 12 comprises a round permanent magnet, the upper surface of which is the north pole and the bottom surface of which is the south pole. Some of the magnetic flux lines in the permanent magnetic field are shown in dotted lines and are referenced 121, 122, 123.

The magnetic circuit 13 has an air gap 131 defined between two identically configured arms 132, 133, which are connected together by a yoke, on which there is wound a winding 14 which serves as a detecting or sensing means.

The relative positioning of the permanent magnet 12 in relation to the magnetic circuit 13 is such that the flux lines 121, 122, 123 of the magnetic field in and closely adjacent to the air gap pass essentially through one plane through the air gap, this plane constituting the symmetry plane of the magnetic circuit. This plane also forms the plane normal to the transport path 0—0 along which bank notes are forced to move past the detector for the purpose of detecting whether or not the bank notes are genuine and/or the types of bank notes present.

A bank note is shown in FIG. 1 and is referenced 15. Incorporated in the bank note are a plurality of magnetic particles which are placed in a specific pattern characteristic to the type of bank note concerned or its denomination. These particles are normally invisible to the naked eye, but have been heavily emphasized in the Figure in order to facilitate the understanding of the description. One such particle, 150, is shown in a greatly enlarged view at the bottom of the bank note. An arrow to the right of the bank note in the direction 0—0 indicates movement of the bank note in the 0—0 direction of the bank note transport path. Bank note transporting means 11 for transportation of the bank notes are symbolically illustrated in the form of two mutually co-acting rollers. It will be understood that a multiple of roller pairs are provided in practice.

FIG. 2 illustrates the bank note 15 as it begins to pass the detector 12–14. The magnetic particles are herewith influenced by the permanent magnetic flux and are magnetized in the opposite direction to the permanent magnet 12. This is indicated schematically by the broken flux lines and the N-S direction in the greatly enlarged particle 150.

As a result of movement of the bank note in relation to the detector a change occurs in the magnetic circuit 13 and an output signal characteristic of the bank note 15 is obtained via the sensing coil 14.

The signals captured by the coil 14 are fed to a signal processing means, which in the FIG. 3 embodiment includes a serially connected input amplifier 30 of the direct-current or alternating-current type having an amplifying factor of $10^4$; a band pass filter 31 of the intermediate-frequency type for the range 1-10 kHz; a rectifying and peak-detector circuit 32; a threshold circuit 33 having a threshold limit of about 0.7 to 1.5 volts; and an output amplifier 34. Since these components constitute standard solutions the manner in which they are constructed or function will not be described in detail here.

The output side of the output amplifier 34 is connected to registering means and to signal means for producing an error signal when a false bank note or a bank note of the wrong type is detected.

The mutually different characters of the signals obtained from two mutually different bank notes A and B which have passed the detector are illustrated in FIG. 4. As will be seen from FIG. 4, certain respective components of the two signals are very different from one another, which enables bank notes of varying kind or denomination to be identified with a high degree of accuracy, even if a bank note should be heavily dirtied, folded, creased, etc.

Although the illustrated embodiment includes a permanent magnet for generating the permanent magnetic flux, it will be understood that this flux may, instead, be generated by means of a solenoid.

The essential feature of the invention is that the magnetic flux is directed so as not to disturb or to saturate the magnetic circuit, i.e. the flux shall be directed perpendicularly to the longitudinal extension of the magnetic circuit on which the winding 14 is mounted. Furthermore, the process circuit is provided with non-linear amplification and is constructed to suppress disturbance signals and to emphasize the unique signal pattern arriving from the detector.

It will be seen from FIG. 5 that during its passage past the detector 12-14 the bank note 15 passes close to the magnetic circuit 13 and the permanent magnet 12.

I claim:

1. An arrangement for detecting documents, such as bank notes, cheques, coupons and the like, exhibiting magnetic properties, the arrangement including transport means (11) for transporting documents along a transport path (0—0) past a magnetic detector (12-14), the magnetic detector (12-14) including means (12) for generating a permanent magnetic field having a north-south-direction in magnetic circuit (13) and being so positioned in relation to the transport means (11) that transported documents are caused to pass by said magnetic circuit (13) and therewith cause changes to occur in the magnetic field in response to the magnetic properties of the documents, characterized in that said magnetic circuit (13) comprises a pair of substantially parallel arms (132, 133) jointed at one end thereof by a yoke and configured at the other end thereof to define a narrow air gap, said gap being located closely adjacent said transport path (0—0) and lying within a plane intercepting the transport path (0—0) essentially perpendicularly to said path, and a detector means (14) which is operative to detect any change in the magnetic field that might occur; said generating means (12) being structured so that the north-south-direction of said magnetic field at a location closely adjacent the air gap extends in the same direction as an intersecting line between said plane and the transport path of a passing document, and said magnetic field at a location closely adjacent the air gap (131) being oriented to lie in said plane; and the output side of the detector means (14) being connected to a signal processing means (30-34) for generating a profile signal in dependence on the magnetic properties of the document.

2. An arrangement according to claim 1, characterized in that said signal processing means (30-34) includes a non-linear amplifier (30) by means of which disturbance signals are suppressed while emphasizing the signal dependent on the magnetic properties of the document.

* * * * *